United States Patent
Pagano et al.

[11] Patent Number: 5,897,230
[45] Date of Patent: Apr. 27, 1999

[54] SOUND STILL CAMERA AND FILM CASSETTE CLASSIFIER SYSTEM

[75] Inventors: Daniel M. Pagano, Honeoye Falls; Stephen J. Rowan, Spencerport; David L. Patton, Webster, all of N.Y.

[73] Assignee: Eastman Kodak Company, Rochester, N.Y.

[21] Appl. No.: 08/824,659

[22] Filed: Mar. 24, 1997

[51] Int. Cl.[6] .............................. G03B 17/24; G03B 17/26
[52] U.S. Cl. .......................... 396/312; 396/319; 396/515
[58] Field of Search .................................. 396/310, 311, 396/312, 319, 320, 515

[56] References Cited

U.S. PATENT DOCUMENTS

| | | | |
|---|---|---|---|
| 4,647,170 | 3/1987 | Stoneham | 396/515 |
| 4,678,300 | 7/1987 | Beach | 396/207 |
| 5,221,939 | 6/1993 | Taniguchi et al. | 396/320 |
| 5,227,823 | 7/1993 | Shigaki | 396/311 |
| 5,229,803 | 7/1993 | Pagano et al. | 396/514 |
| 5,280,327 | 1/1994 | Stoneham et al. | 396/389 |
| 5,432,570 | 7/1995 | Ueda et al. | 396/319 |
| 5,552,849 | 9/1996 | DiRisio et al. | 396/515 |
| 5,570,152 | 10/1996 | Kaya | 396/515 |
| 5,617,161 | 4/1997 | Serita et al. | 396/319 |
| 5,655,164 | 8/1997 | Tsai | 396/312 |
| 5,742,857 | 4/1998 | Nanba et al. | 396/319 |

*Primary Examiner*—Eddie C. Lee
*Attorney, Agent, or Firm*—Francis H. Boos, Jr.

[57] ABSTRACT

Sound with still image film system, camera and cassette classifier apparatus wherein indicium such as a deformable tab on the film cassette is modified to indicate sound is or will be recorded in association with pictures taken on the film in the cassette. The camera includes a mechanism responsive to a control input such as actual recording of sound to cause the tab to be modified (bent inwards or broken off) to provide a visible indication that the cassette is to receive sound associated processing. Classifier apparatus at the retail order station includes a physical sensor to detect the modified tab condition and initiate a signal indicating a sound capable film cassette as well as possible order entry functions and recording of sound order associated on a film magnetic layer on the leader of the film.

3 Claims, 8 Drawing Sheets

SOUND STILL CAMERA AND FILM CASSETTE CLASSIFIER SYSTEM

FIELD OF THE INVENTION

The invention relates generally to photographic cameras and systems in which still images and sound are captured as part of a picture taking event. More specifically, it relates to providing indications on the film cassette and utilizing such indications to identify and handle film cassettes that have been used in cameras in which sound has been recorded during picture taking.

BACKGROUND OF THE INVENTION

Recording of sound in a still photographic camera as part of a picture taking event is desirable to enhance the experience of viewing and enjoying the resultant photographic prints. Numerous disclosures exist of sound recording and playback associated with still prints. There is no disclosure, however, of providing an indication of the fact that a film cassette has been utilized in a sound recording capable camera or that sound recording has been done in association with images captured on film in a given film cassette. Such information is useful as a reminder to the camera user and is also useful to a photofinishing laboratory which must handle and process such sound with still image film in special equipment, such as would be needed to transfer camera recorded sound onto memory chips for attachment to the associated photoprints. There is a need therefore for camera and film cassette classifier apparatus that will identify film cassettes that have or will have sound recordings associated therewith and for apparatus that will automatically identify such sound/film cassettes for use by photofinishing laboratories.

SUMMARY OF THE INVENTION

In accordance with one aspect of the invention therefore, there is provided in a still image photographic camera having sound recording apparatus therein, means for accepting a cassette containing photographic film therein, the cassette having modifiable indicium indicating whether or not sound has been recorded on the film during a picture taking sequence and means operative in response to actuation of the sound recording apparatus to record sound during a picture taking sequence to modify the indicium to thereby indicate sound has been recorded in association with image capture on the film in the cassette. The sound may be recorded directly on a magnetic layer formed on the film as in the recently introduced Advanced Photographic System film. Alternatively, the sound may be recorded by the camera on a removable memory card which is intended to be sent with the film to the photofinishing laboratory for transfer of image related sound segments to memory chips that are to be physically attached to the related photoprints.

In accordance with another aspect of the invention, a sound film cassette identification device is provided which includes means for sensing an indicium on the film cassette to determine whether the cassette contains film in association with which sound has been recorded and responds thereto to generate a sound related film signal which is recorded on the film, e.g. by magnetic recording on a leader portion of the film strip or is sent via a communication link to the photofinishing laboratory for use in recognizing the cassette when it is received at the laboratory for segregating sound related film cassettes from non-sound related film strips.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
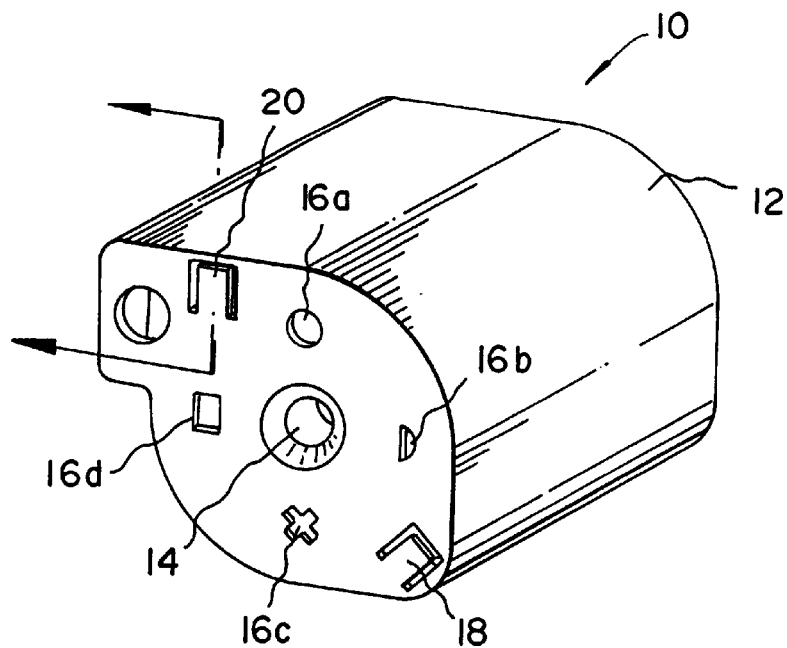
FIG. 1 is a perspective illustration of a film cassette showing a sound recording indicium used to indicate whether the cassette contains film for which sound has been recorded in association with images captured on the film in the cassette.

In FIG. 1, there is shown a film cassette 10 of the type used in the recently introduced Advanced Photographic System (APS). The cassette 10 comprises a housing 12 a rotatable internal spool 14 on which is wound a roll of photographic film (not shown) having a layer of magnetic recording material coated on the opposite side of the film base from the photographic emulsion layer. The housing 12 is also provided at one end with four shaped apertures 16a–d which serve as visual indicators of the status of the film in the cassette. A contrasting label (not shown) inside the housing is rotatable with the film spool and, depending on the locked setting of the spool, is seen through one of the apertures to indicate whether the film is completely unexposed (16a), partially exposed (16b), fully exposed (16c) or processed (16d). Additionally, an indicium in the form of a deformable or frangible tab 18 is provided on the end of the housing to provide a mechanical means detectable by photofinishing equipment to indicate that the film in the cassette has been processed, thereby physically preventing the photofinisher from inadvertently running processed film through the developrobeg process again.

Figure 2:
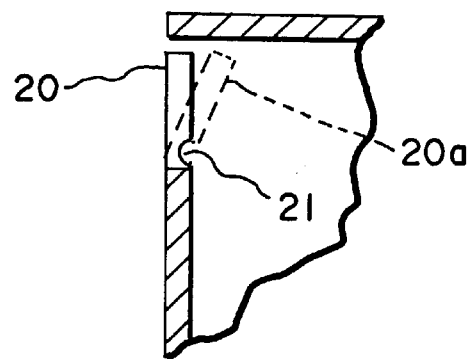
FIG. 2 is a side cutaway view of a portion of the cassette of FIG. 1 showing the sound recording indicium in more detail.

The magnetic layer on the film is used to record a variety of data related to photographic parameters associated with picture taking and photofinishing procedures. When the film is used in a sound recording capable camera, the magnetic layer may also be used to record data indicating that sound has been recorded in association with the capture of an image during a picture taking event and stored on a memory medium such as an internal memory chip or a removable memory card. Alternatively, the magnetic layer may be used as the memory medium direct storage of the sound data. It is desirable to provide an indicium on the cassette that will indicate whether film in the cassette has had sound recorded in association with the capture of images on the film. For this purpose, and in accordance with one aspect of the invention, a deformable or frangible tab 20 is provided on the end of the cassette housing 12 in a location separate from the "processed" indicator tab 18. Tab 20 may be the same as or similar in construction to tab 18. Preferably the tab is formed by a cutout on three sides with the fourth side integrally formed with the end cap of the housing via a relieved hinged section 21 as shown in FIG. 2. When depressed by a probe as described later, the tab is bent inwards and either remains in the inward bent state as shown in dotted outline 20a or is broken off entirely. In either event, an opening is created which provides both a visual and mechanical means of indicating on the cassette housing 12 that sound has been recorded in association with images captured on the film in the cassette.

Figure 3:
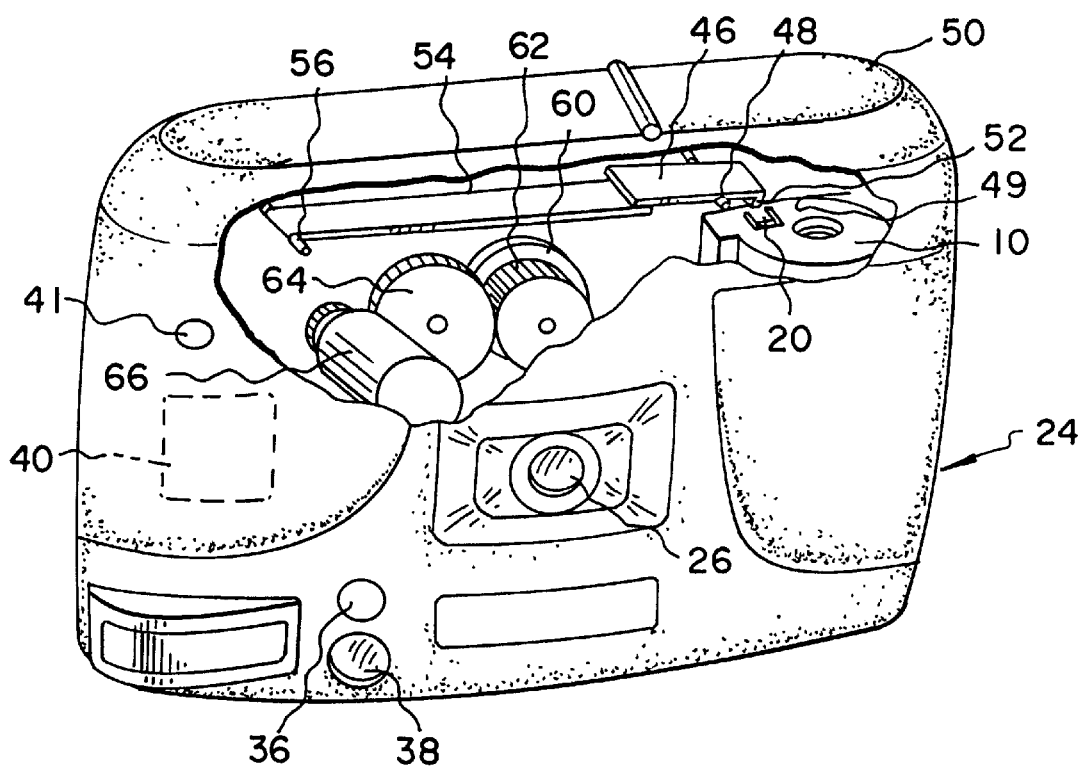
FIG. 3 is a schematic perspective illustration of a sound capable camera with a cutaway view showing a mechanism for causing modification of a sound indicium on a film cassette loaded into the camera.
Figure 4:
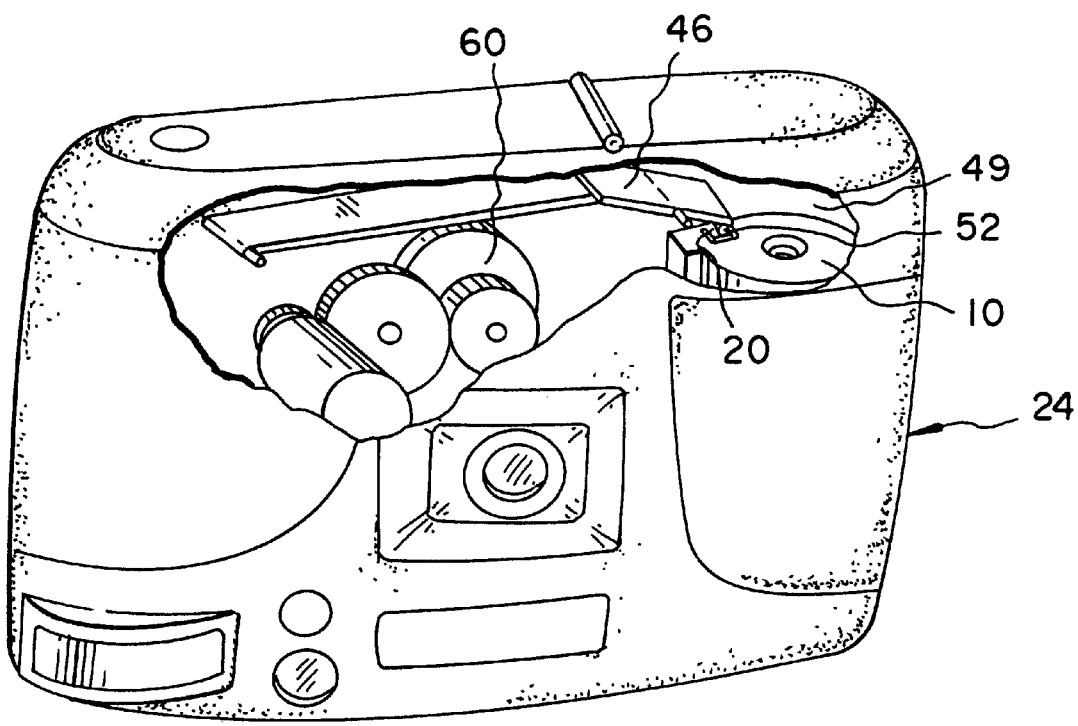
FIG. 4 is a another illustration of the camera of FIG. 3 showing actuation of the mechanism for modifying the cassette indicium when sound has been recorded during a picture taking event.

Referring to FIG. 3, a camera 24 is shown which is capable of recording sound as part of a picture taking event and which, in accordance with another aspect of the invention, is provided with means for modifying the indicium on the film cassette to indicate that sound has been recorded. As shown in the drawing, camera 24 includes a taking lens 26, a microphone 36, a speaker 38 and a sound recording and playback electronic circuit 40. The camera further includes means responsive to the sound recording circuit as a consequence of sound being recorded during a picture taking event for modifying the indicium on cassette to thereby indicate that sound has been recorded in association with image capture on the film is in the cassette. To this end, an actuation arm 46 is pivotally mounted by means of a pivot probe 48 to a cassette door 50. The arm 46 extends out over the end of the cassette 10 inserted in the camera cassette receiving chamber 49 and has a deforming probe 52 positioned on the end of the arm 46 so as to be aligned with the sound indicator tab 20 on the end of the cassette 10. A lever 54 is mounted at one end on a pivot probe 56 and extends at the other end beneath the end of actuation arm 46. An eccentric cam 60 is journalled on gear 62 which is part of a reducing gear train 64 driven by an actuator motor 66. The motor is responsive to a signal from sound recording circuit 40 to rotate the eccentric cam 60 into engagement with the underside of lever 54 as shown in FIG. 4, forcing the lever up into engagement with actuation arm 46 thereby pivoting the arm 46 to drive deforming probe 52 into engagement with sound indicator tab 20 with sufficient force to permanently deform or break the tab 20.

In some situations, the camera user may wish to take pictures with the camera of FIG. 3 but without recording sound directly at the time the picture is taken. For example, it may be that the user is taking pictures in a high ambient noise situation and wishes to add descriptive sound after the film has been developed and the prints made. It is known that, through special processing techniques, sound recording media, such as a solid state sound recording chip, can be affixed to the print, e.g. on the back of the print, for use in recording sound via a special recording and playback device. It is desirable to accomodate this special processing by identifying the the cassette as one in which the resultant prints are to be specially batched for addition of the sound recording media to the prints in the same manner as prints for which sound was recorded at the camera during the picture taking sequence. To this end, camera 24 may be provided with a button 41 which is adapted to actuate the probe mechanism to deform the cassette tab 20 in the same manner as occurs in response to the actuation of the sound recording apparatus for actual recording of sound. As used herein, the phrase "sound order capable" is thus intended to encompass film for which sound is recording at the camera during a picture taking sequence as well as film which is to be used for producing prints with attached sound memory devices on which sound will be recorded during subsequent viewing in appropriate sound recording equipment.

Figure 5:
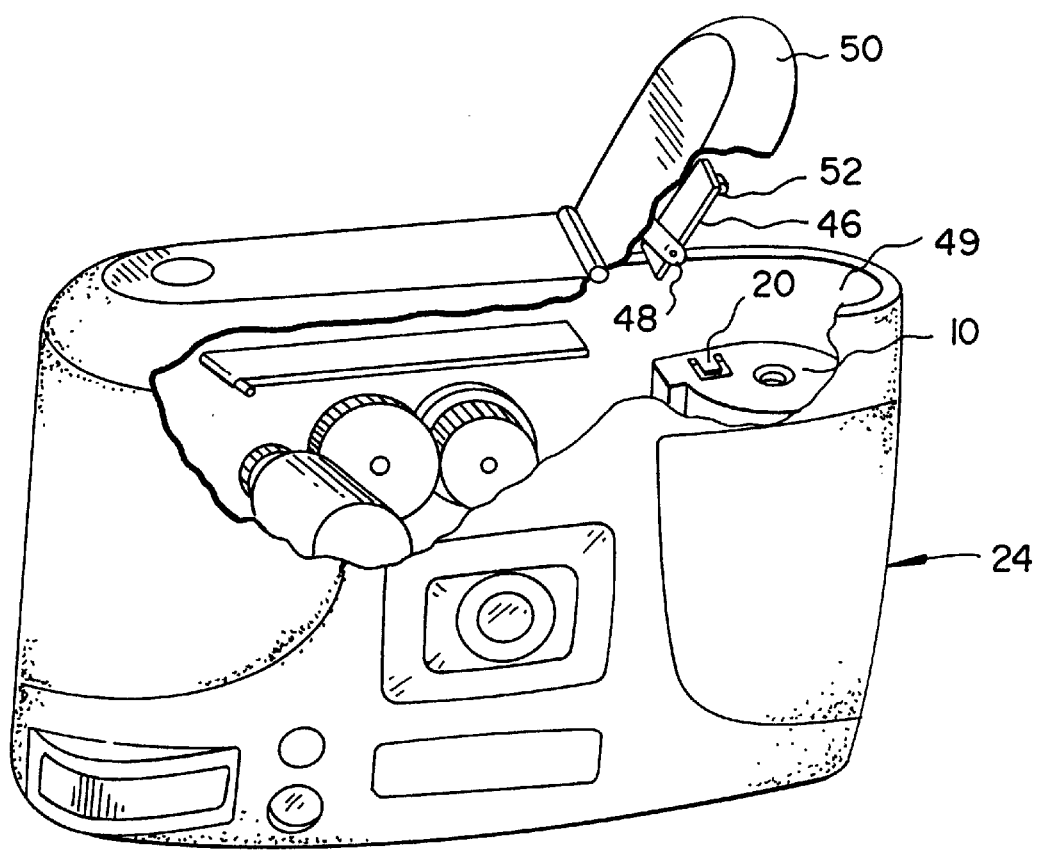
FIG. 5 is another illustration of the camera of FIG. 3 with the cassette loading door in an open position.

When the cassette chamber door 50 is opened as shown in FIG. 5, the actuation arm 46 is raised up out of the way of the cassette chamber allowing the film cassette 10 to be inserted and removed from the chamber 49 without interference with the actuation arm 46 and probe 52.

Figure 6:
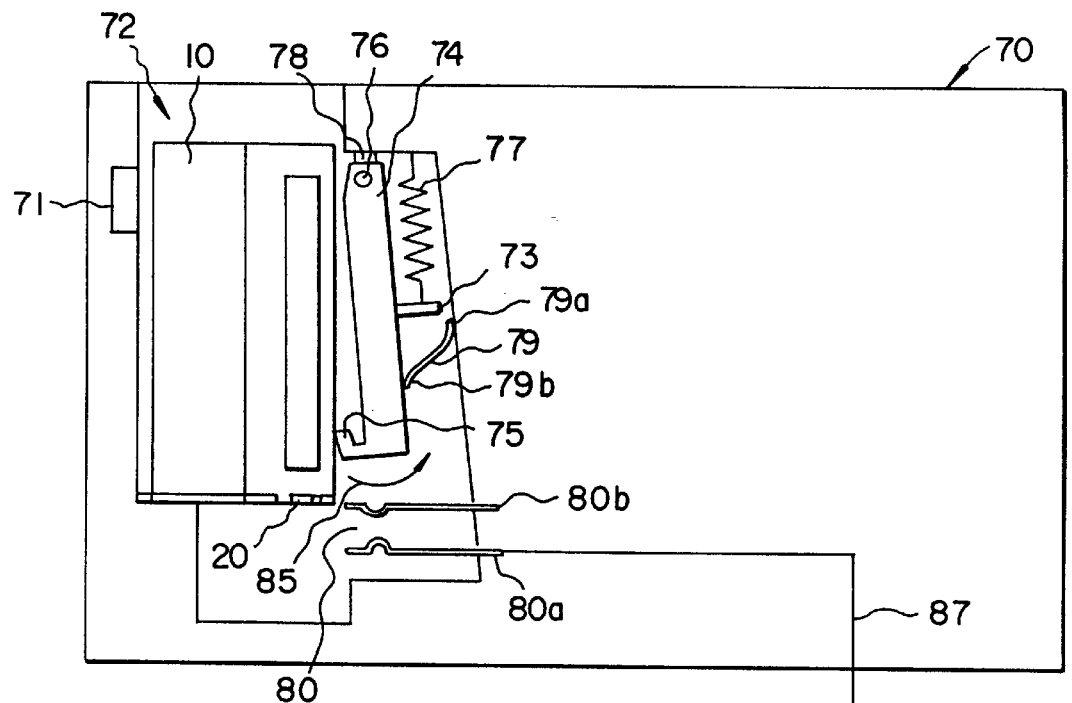
FIG. 6 is a schematic illustration of a sound cassette detecting apparatus used to automatically distinguish between cassettes that contain film for which sound has been recorded and cassettes for which no sound has been recorded.

Turning now to FIG. 6, there is shown cassette classifier apparatus 70 used at a retail order station or at a photofinishing lab to determine if the film cassette 10 contains film with which sound has been recorded, either for storage in a separate memory device or magnetically recorded on the film magnetic layer. The classifier apparatus includes a cassette receiving chamber 72 into which a cassette 10 is inserted with the end bearing the indicator tab 20 at the bottom. A bar code reader 71 may be included for reading cassette ID information, printed on the side of the cassette, as the cassette is inserted into the chamber. The apparatus includes a feeler arm 74 pivotably mounted on pivot probe 76 at one side of the cassette receiving chamber 72. The pivot probe is slidably engaged in a slot 78 to allow movement of the pivot arm longitudinally of the cassette chamber 72. The feeler arm is provided with a hooked end 75 which is positioned such that the hooked end engages the area of the end of the cassette which carries the sound indicator tab 20. The cross sectional shape of chamber 72 is configured to conform with the shape of the cassette so as to ensure proper orientation of the tab within the chamber. A tension spring 77 is attached to the feeler arm 74 at an intermediate attachment point 73 to urge the arm upwards towards the top of slot 78. A leaf spring 79 having a relatively low spring force is attached at end 79a to the chamber wall with the other end 79b slidably engaging the feeler arm to gently urge the feeler into a vertical orientation with the hooked end in position under the area of the indicator tab 20. An electrical switch 80 having a fixed contact arm 80a and a movable contact arm 80b is positioned below the feeler arm just below the position of cassette 10 when it is fully inserted into the receiving chamber 72.

When a film cassette is inserted with the tab end downwards, the side of the cassette 10 slides along the length of the feeler arm 74. When the end of the cassette reaches the hooked end 75 of the feeler arm, if the tab 20 has not been disturbed, thereby indicating that sound has not been recorded in association with the film in the cassette, the hooked end is prevented from entering the opening in which the tab lies and the feeler arm 74 is urged outward in the direction of arrow 85 against the leaf spring allowing the cassette to be fully inserted into the chamber. The electrical spring is positioned below the cassette in the chamber and is not disturbed by insertion of the cassette. Consequently, no electrical contact signal is output from the switch on output line 87.

Figure 7:
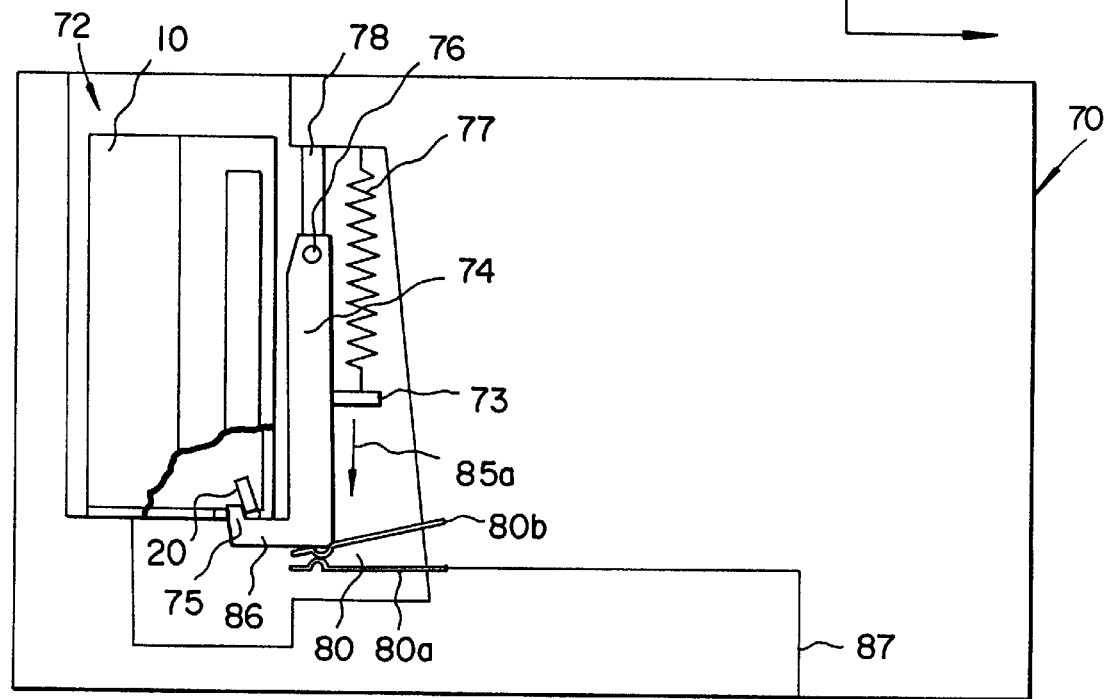
FIG. 7 is a schematic illustration of the sound cassette detecting apparatus of FIG. 6 showing detection of a cassette carrying film for which sound has been recorded.

Turning now to FIG. 7, the operation of apparatus 70 is shown for the condition of a cassette for which sound has been recorded as indicated by the modification of the tab 20 on the cassette. When the cassette is inserted into the cassette receiving chamber 72, the cassette slides along feeler arm 74 until the cassette reaches hooked end 75. Since tab 20 has been bent back at the camera, the tab opening is now vacant and hooked end 75 enters the opening and holdingly engages the cassette. Continued insertion of the cassette pulls the feeler arm 74 downwards, as shown by arrow 85*a*, until the bottom end 86 engages switch arm 80*b*. This closes the switch contacts 80*a–b* to send a signal indicating that the cassette is a sound film cassette. Output line 87 may be connected to an indicator light to indicate the status of the cassette or to a microprocessor (FIG. 8) to initiate certain control operations.

Figure 8:
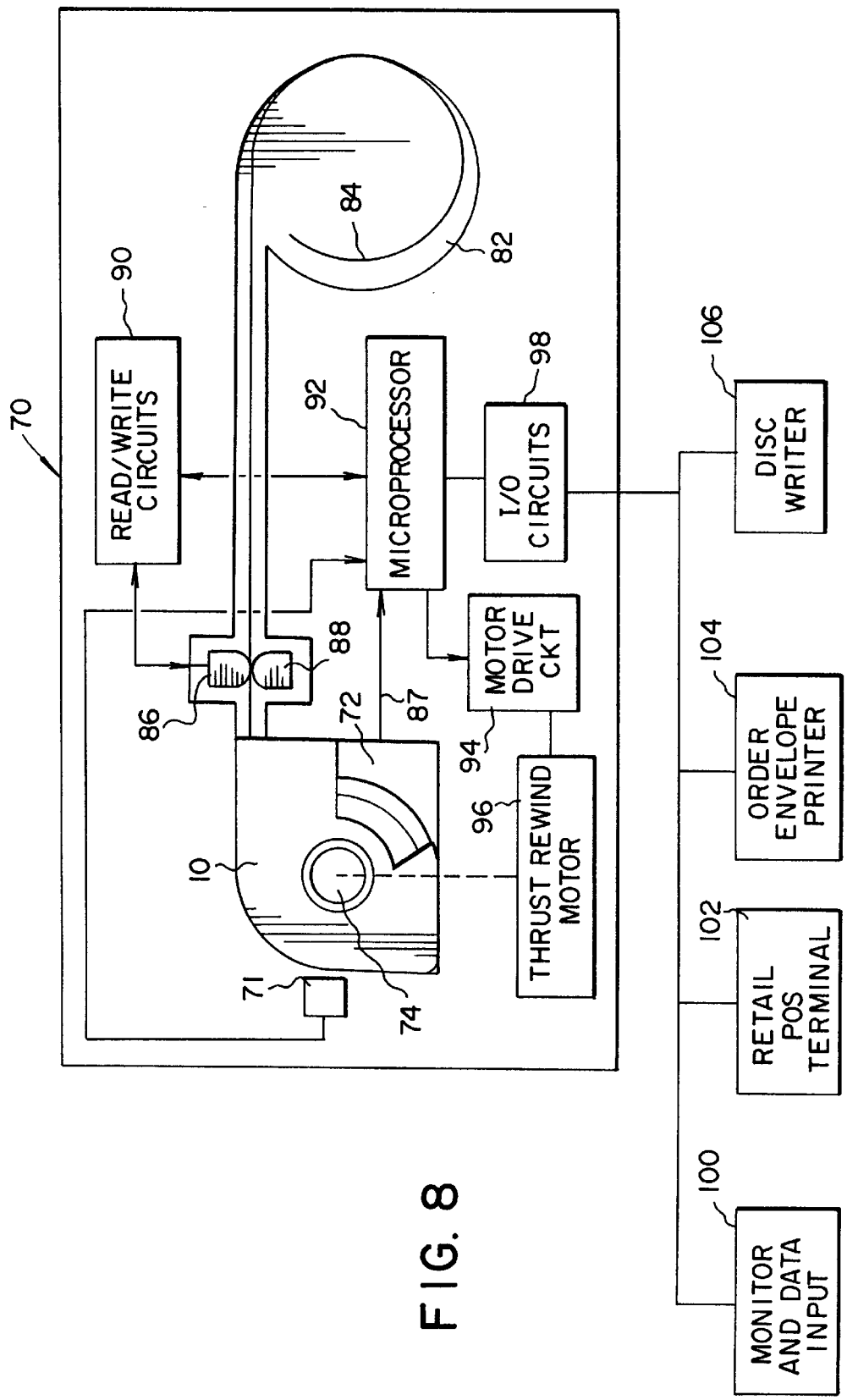
FIG. 8 is a schematic illustration of the sound cassette detecting apparatus of FIG. 6 illustrating additional features associated with the apparatus.

FIG. 8 shows a top view of the classifier apparatus 70 illustrating additional features utilizing the results of the sensor operation. In the illustrated apparatus, a microprocessor 92 is connected by line 87 to the sensor switch 80 (FIG. 6). An optional bar code reader 71 is also coupled to a data input of the microprocessor. When a sound associated cassette is sensed, the microprocessor causes motor drive circuit 94 to actuate a thrust/rewind motor 96 to rotate film spool 14 to thrust a leader portion of film 84 past a magnetic read/write head 86 into a temporary take up chamber 82. A pressure pad 88 maintains good interface contact between the head 86 and the magnetic layer on the film. Read/write circuits 90 amplify and convert between analog and digital signals for interfacing between head 86 and microprocessor 92. I/O circuits 98 provide data interface between the microprocessor 92 and external terminals, such as a monitor and data input terminal 100, a retail "point-of-sale" terminal 102, an order envelope printer 104 and a magnetic floppy disc writer 106 or other form of memory writer such as an EEPROM writer.

Figure 9A:
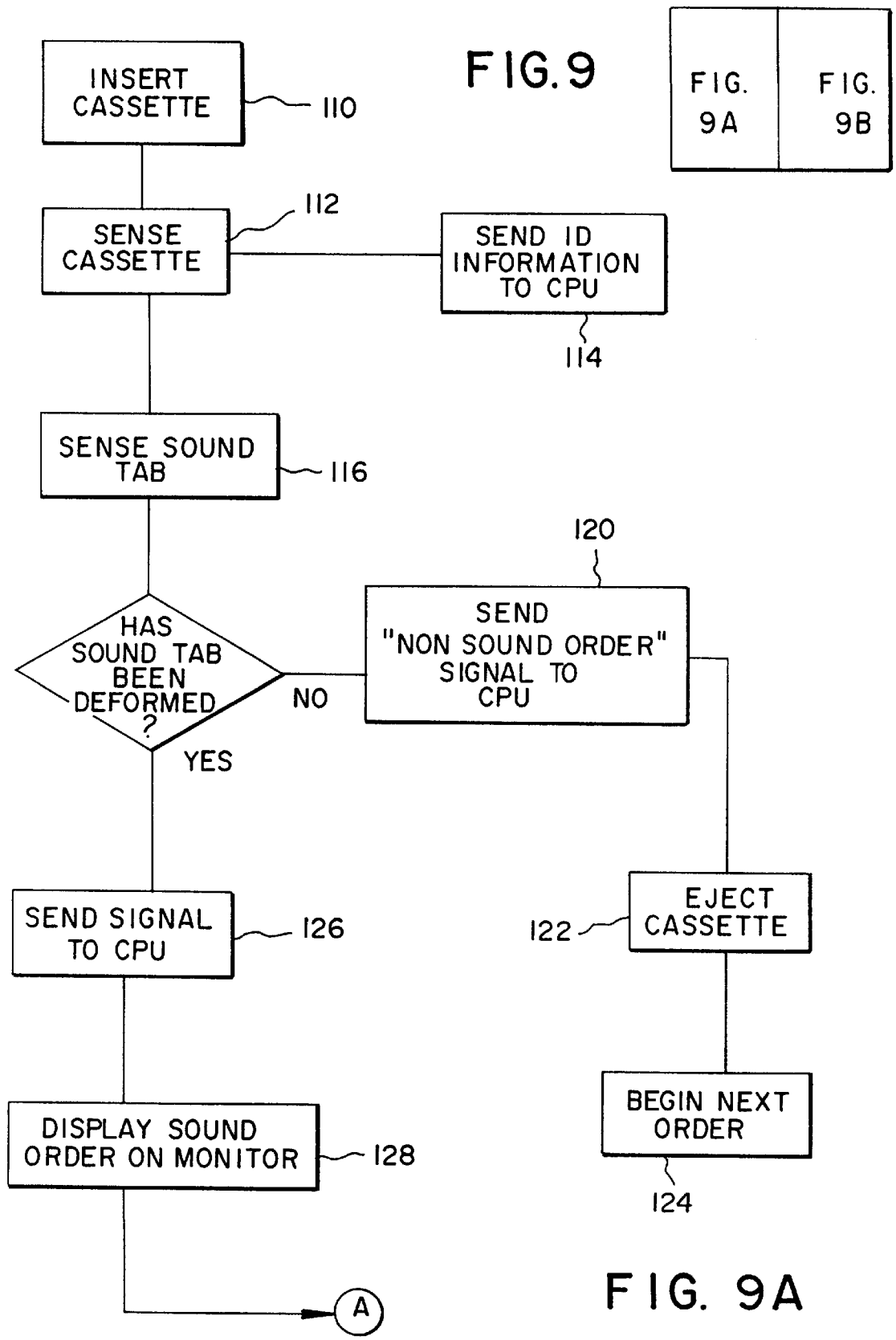
FIG. 9 is a flow chart showing the steps associated with use of the sound film cassette detecting apparatus of FIG. 6.
Figure 9B:
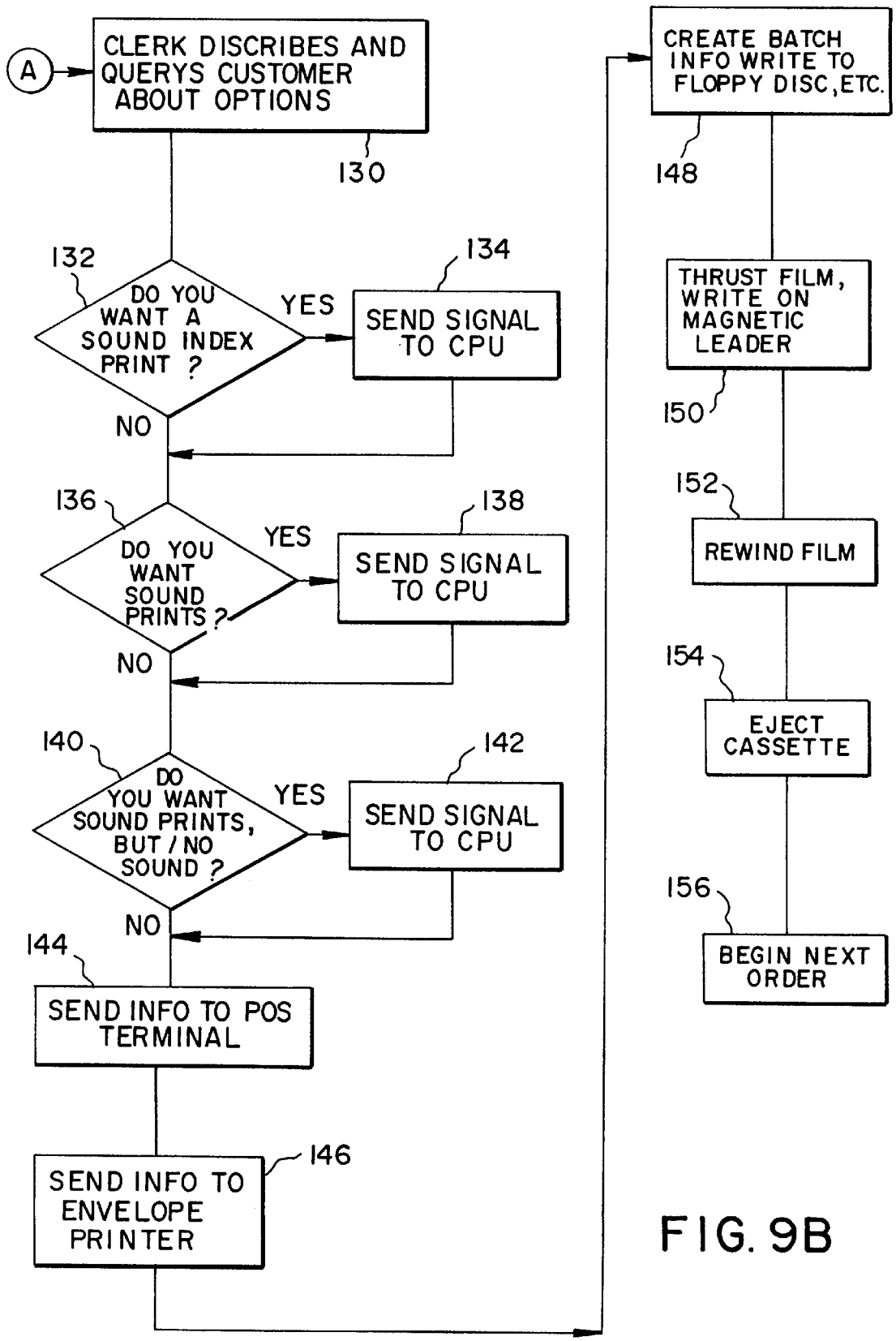

FIG. 9 shows a functional flow chart illustrating steps that utilize the sound cassette classifier apparatus in the operation of identifying and sorting cassettes that have sound recorded in association with the film. At step 110 the cassette is inserted into the apparatus receiving chamber 72 of the classifier apparatus 70. For batch control purposes, the classifier apparatus may include a read mechanism (not shown) for reading cassette identification information from the side of the cassette which is performed in step 112 and the resultant data is sent to the microprocesser 92 (CPU) in step 114. Since both a sound and non-sound cassette can exist, the sound classifier apparatus checks the cassette at step 116 in the manner described above to determine if the cassette has film with associated sound recording. If the query 118 result indicates that the tab 20 is not violated, i.e. is in the normal aperture blocking position, a signal indicating that fact is sent to the CPU at step 120 and the cassette is removed at step 122 and placed in a non-sound order batch after which the classifier apparatus waits (124) for insertion of another cassette. If the query 118 result indicates that the tab 20 has been violated, step 126 sends a corresponding signal to the CPU which causes the CPU at step 128 to display a sound order options menu on monitor 100. Using this menu, the clerk then queries (130) the customer about the sound order options available. Affirmative answers to any of the queries 132, 136, and 140 are sent in steps 134, 138 and 142 to the CPU for insertion into batch order instructions. This information is then sent in step 144 from the CPU to the POS terminal 102 for printing of a receipt; in step 146 to envelope printer 104 for printing of order data onto the envelope used for sending the cassette to the photofinishing lab; and, optionally in step 148, to floppy disc writer 106 where the sound order batch data may be accumulated for transmission to the photofinishing lab. Additionally, in step 150, microprocessor 92 activates motor 96 to thrust the film out of the cassette past read/write head 86 for writing of the sound order data onto the film leader magnetic layer. When writing of the data is completed, the film is rewound into the cassette in step 152, the cassette is removed in step 154 and the classifier is then ready for the next order in step 156.

The invention has been described with reference to a preferred embodiment. However, it will be appreciated that variations and modifications can be effected by a person of ordinary skill in the art without departing from the scope of the invention.

PARTS LIST

| | PARTS LIST | | |
|---|---|---|---|
| 10 | film cassette | 66 | actuator motor |
| 12 | housing | 70 | cassette classifier apparatus |
| 14 | film spool | | |
| 16a-d | film status indicators | 72 | cassette receiving chamber |
| 18 | "processed film" tab | 73 | intermediate attachment point |
| 20 | "sound with film" tab | 74 | feeler arm |
| 21 | tab hinge | 76 | pivot probe |
| 24 | sound capable camera | 77 | tension spring |
| 26 | taking lens | 78 | slot |
| 30 | flash device | 79 | leaf spring |
| 32 | autofocus sensor | 80 | electrical switch |
| 34 | scene light sensor | 84 | film |
| 36 | microphone sensor | 86 | magnetic read/write head |
| 38 | speaker | | |
| 40 | sound recording and playback circuit | 88 | pressure pad |
| | | 90 | read/write circuits |
| 46 | actuation arm | 92 | microprocessor |
| 48 | pivot probe | 94 | motor drive circuit |
| 49 | receiving chamber | 96 | thrust rewind motor |
| 50 | cassette door | 100 | monitor and data input terminal |
| 52 | deforming probe | | |
| 54 | lever | 102 | POS terminal |
| 56 | pivot probe | 104 | order envelope printer |
| 60 | eccentric cam | | |
| 62 | gear | 106 | magnetic floppy disc writer |
| 64 | reducing gear train | | |

What is claimed is:

1. A still image photographic camera having sound recording apparatus therein, the camera comprising:

a cassette receiving chamber for accepting a cassette containing photographic film therein, the cassette having an indicium modifiable between first and second conditions to indicate by said second condition that sound has been recorded in association with the film during a picture taking sequence; and modifying means operative in response to actuation of said sound apparatus to record sound during a picture taking sequence to modify said indicium to thereby indicate sound has been recorded in association with the film in the cassette.

2. The camera of claim 1 wherein the indicium is a deformable tab and said indicium modifying means comprises a probe adapted to engage and deform said tab in response to actuation of said sound recording apparatus.

3. The camera of claim 2 wherein said indicium is located on an end of said cassette, said cassette receiving chamber includes a pivoted door and the chamber is shaped to allow endwise insertion of the film cassette with the indicium facing said door and said probe is pivotably mounted on the door to allow insertion and removal of the cassette without interference with the probe.

* * * * *